(12) United States Patent
Reid

(10) Patent No.: US 7,688,005 B2
(45) Date of Patent: Mar. 30, 2010

(54) LIGHTING LOAD MANAGEMENT SYSTEM FOR LIGHTING SYSTEMS HAVING MULTIPLE POWER CIRCUITS

(75) Inventor: Drew A. Reid, Brentwood, TN (US)

(73) Assignee: Square D Company, Palatine, IL (US)

( * ) Notice: Subject to any disclaimer, the term of this patent is extended or adjusted under 35 U.S.C. 154(b) by 199 days.

(21) Appl. No.: 11/881,194

(22) Filed: Jul. 25, 2007

(65) Prior Publication Data

US 2009/0026979 A1    Jan. 29, 2009

(51) Int. Cl.
    H05B 41/36    (2006.01)
(52) U.S. Cl. .................... 315/307; 315/291; 315/308
(58) Field of Classification Search ............... 315/291, 315/307, 308, 209 R, 86, 88, 89, 90, 129, 315/130, 160, 161, 210, 224, 225, 226, 209 T, 315/293, 292, 294, 295, 297, 299, 362
    See application file for complete search history.

(56) References Cited

U.S. PATENT DOCUMENTS

| | | | |
|---|---|---|---|
| 5,473,202 A | 12/1995 | Mudge et al. | |
| 5,699,243 A * | 12/1997 | Eckel et al. | ............... 700/17 |
| 5,701,117 A | 12/1997 | Platner et al. | |
| 5,864,184 A | 1/1999 | Platner et al. | |
| 6,215,398 B1 | 4/2001 | Platner et al. | |
| 6,304,180 B1 | 10/2001 | Platner et al. | |
| 6,850,159 B1 | 2/2005 | Mudge | |
| 6,963,175 B2 * | 11/2005 | Archenhold et al. | ......... 315/291 |

OTHER PUBLICATIONS sensorswitch CMR-6-2P-AR-LT & CMR-6-2P-AO-LT, Sensor Switch, Inc., Wallingford, CT, 2006 (2 pages).
Sensorswitch Daylighting Control, Sensor Switch, Inc., Wallingford, CT, (6 pages).
Square D Powerlink G3 Light Control Systems, Schneider Electric-North America, LaVergne, TN, 2006 (8 pages).

* cited by examiner

*Primary Examiner*—Douglas W Owens
*Assistant Examiner*—Jianzi Chen

(57) ABSTRACT

A lighting control system is provided for a space that is equipped with multiple lamps for illuminating the space and multiple power circuits for supplying power to different groups of the lamps. The control system stores information relating to the past illumination of the lamps in each of the different groups. The system detects conditions or events that indicate that increased illumination of the space by the lamps is needed, and produces a control signal in response to the detection of a condition or event that indicates that increased illumination of the space by the lamps is needed. In response to the control signal, the system supplies power to at least one of the power circuits, which is selected on the basis of the stored information, to turn ON the group of lamps receiving electrical power from that power circuit.

20 Claims, 7 Drawing Sheets

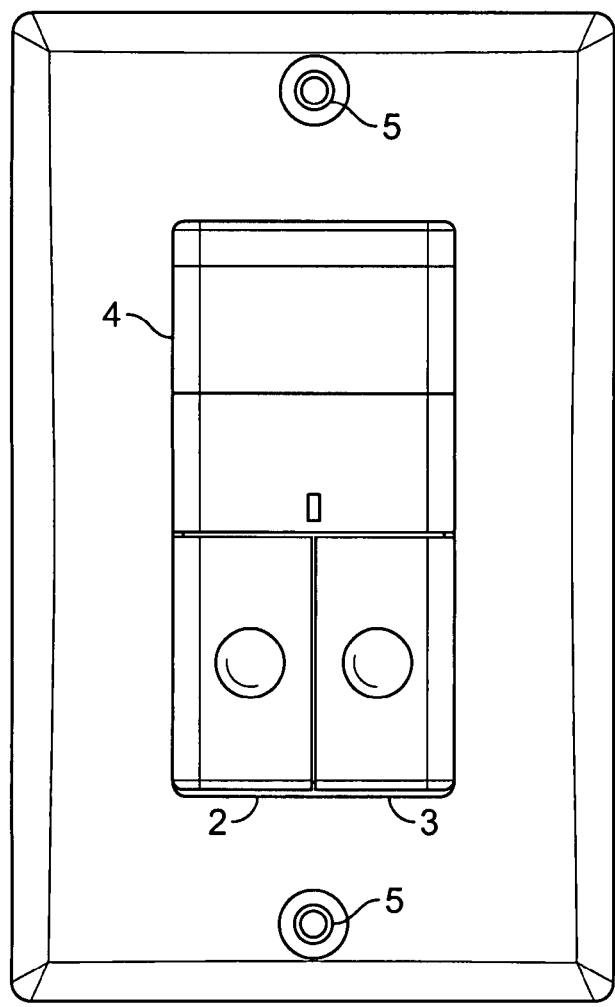
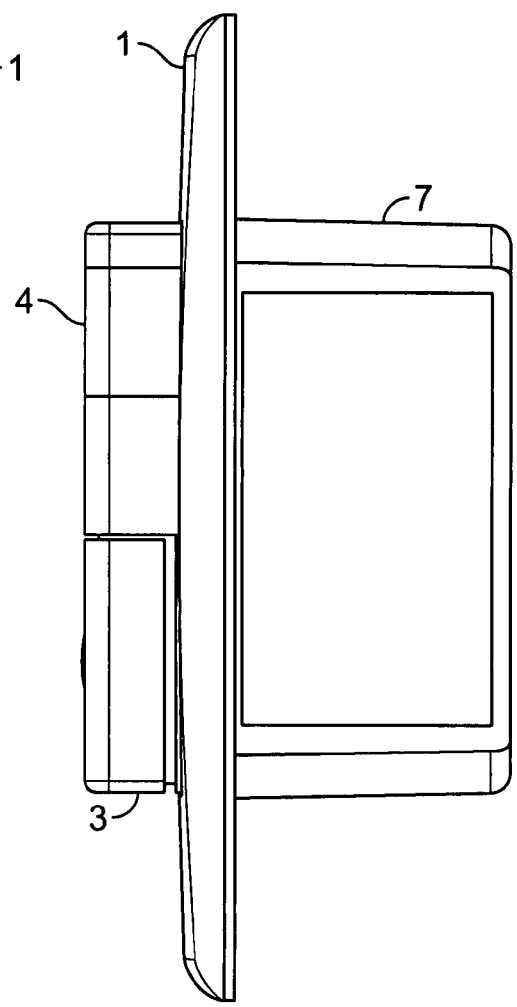
FIG. 1     FIG. 2
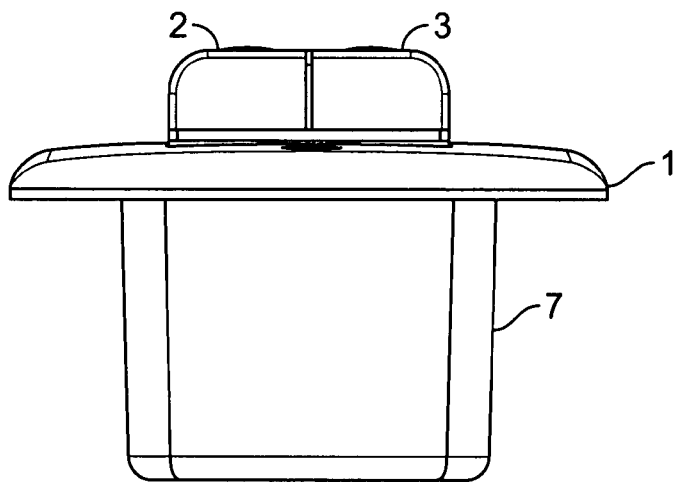
FIG. 3

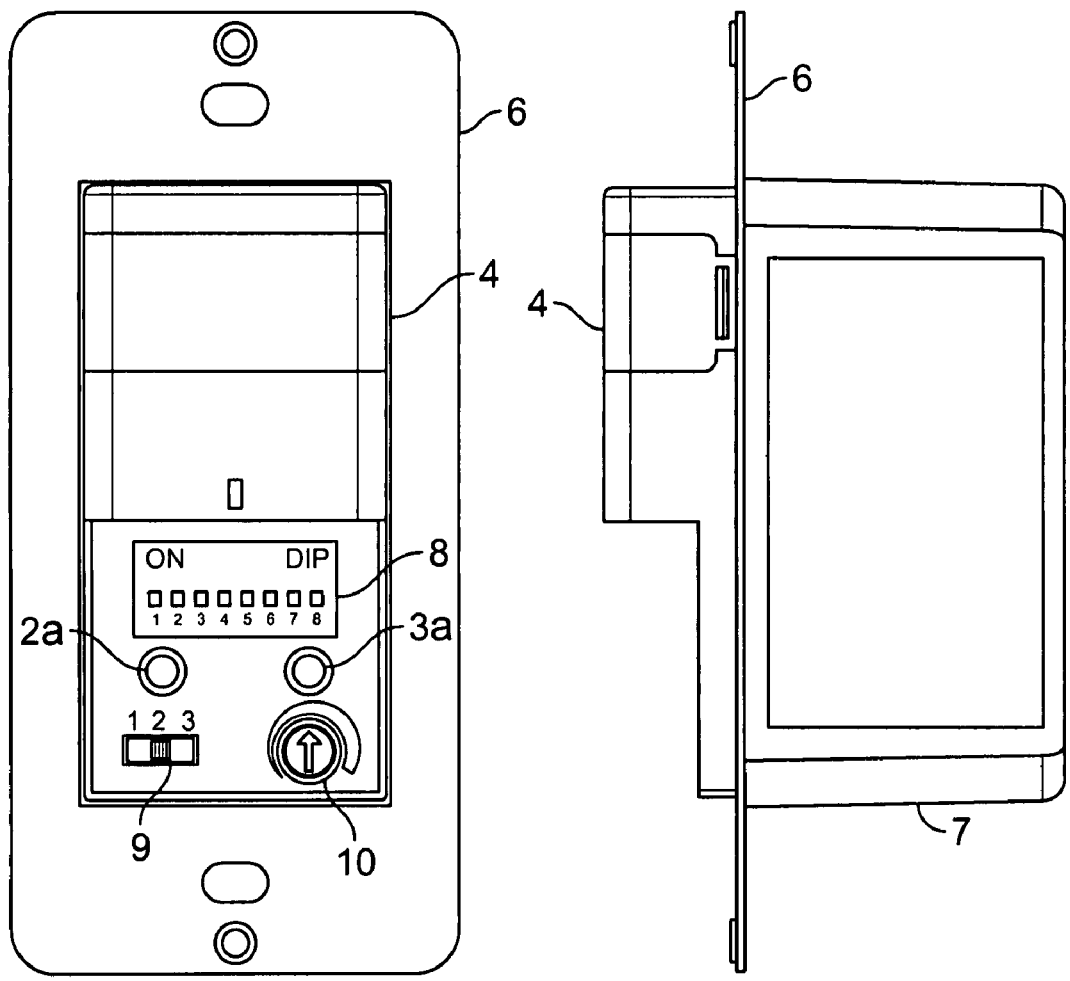
FIG. 4  FIG. 5
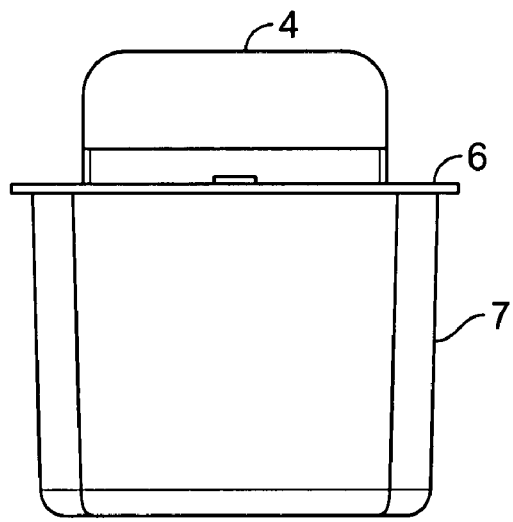
FIG. 6

LIGHTING LOAD MANAGEMENT SYSTEM FOR LIGHTING SYSTEMS HAVING MULTIPLE POWER CIRCUITS

FIELD OF THE INVENTION

The present invention relates to a lighting load management system for lighting systems having multiple power circuits and that automatically turn lights ON and/or OFF in response to control signals from sensors that detect whether a space is occupied or not occupied.

BACKGROUND OF THE INVENTION

Automatic shut-off lighting controls are used to save electrical energy, and are often required by legislated energy codes. Today's control devices have multiple control outputs which are used to operate multiple lighting circuits in a particular area. The advantage of having multiple circuits feeding an area is that multiple levels of light can be achieved by selecting the number of circuits that are ON simultaneously. This multiple-level ability is also required by some energy codes so that lower levels of artificial illumination can be provided in an occupied area.

The type and arrangement of light fixtures is a factor in the application of multiple-circuit lighting controls. For example, alternate rows of lights can be fed from different circuits such that when only a portion of the lights are turned ON—same for OFF, the level of illumination is relatively even. This method can also be used with the light fixtures wired in a checker board pattern. Another common variation is the use of light fixtures with multiple ballasts, or specialty ballasts that can be fed from multiple circuits. This approach allows control of individual lamps within the fixture. For example, a light fixture with four lamps and two ballasts can provide illumination levels of 0%, 50%, or 100%. Another example is a light fixture with three lamps and two ballasts that can provide illumination levels of 0%, 33%, 66%, or 100%, achievable by having one ballast to provide energy to one lamp and the other to two lamps.

Multiple lighting levels can be controlled manually by a wall switch, automatically by a sensor, or both. An occupancy sensor can be used to automatically turn lights ON when a person enters an area and then turn lights OFF when all occupants have left an area. A light level sensor is often used in conjunction with this approach to prevent one or more light circuits from turning ON in response to occupancy. Natural light from windows, skylights or other sources adds to the illumination of the area. When a lighting control device determines that sufficient natural light reduces the need for artificial light, it will respond by allowing only a minimum level of artificial lighting to be automatically turned ON.

The multiple-circuit approach is also useful in situations where no natural light is available. An occupancy sensor will automatically turn ON lights when a person enters an area. To save energy, only a minimum level of light will be turned ON in response to this event. If a task in the area requires greater illumination, the occupant can manually turn ON additional light levels. The lighting control device will turn OFF all light circuits when the area is unoccupied. Only the minimum level will be restored on subsequent entries to the area.

Although these methods save energy, there are some detrimental side effects to the automatic shut-off control. If an occupancy sensor turns lights OFF long after the last occupant has left an area, energy is wasted. If an occupancy sensor turns lights ON and OFF too frequently, the lamp life is significantly diminished. The cost of replacing lamps, as well as the temporary loss of use for the area, is undesirable. A great deal of effort has been expended by the manufacturers of occupancy sensors to optimize timing.

Even if timing is optimized to solve the problem of frequent cycling, another problem remains. All such sensors respond to events by turning ON a designated primary circuit, with the designated secondary circuit turning ON only in response to the light sensor or a manual event. As a result, lamps connected to the primary circuit will cycle more frequently than lamps connected to the secondary circuit.

Replacement of lamps typically occurs by one of two methods: spot re-lamping, in which lamps are replaced when they fail, and group relamping, in which all lamps are replaced based upon a predictive maintenance calculation of lamp life. Lamp life is affected by the number of starts and total burn hours. In the spot re-lamping scenario, the lamps connected to the primary circuit will be replaced more often than lamps connected to the secondary circuit. The costs of spot re-lamping are very high since it requires multiple service events. In the group re-lamping scenario, the predictive maintenance calculation is normally based on the primary circuit, causing the secondary circuit lamps to be replaced while they still have much useful life. Since lamps often contain toxic materials, such as mercury, disposal of useful lamps is environmentally insensitive.

SUMMARY OF THE INVENTION

In one embodiment, a lighting control system is provided for a space that is equipped with multiple lamps for illuminating the space and multiple power circuits for supplying power to different groups of the lamps. The control system stores information relating to the past illumination of the lamps in each of the different groups. The system detects conditions or events that indicate that increased illumination of the space by the lamps is needed, and produces a control signal in response to the detection of a condition or event that indicates that increased illumination of the space by the lamps is needed. In response to the control signal, the system supplies power to at least one of the power circuits, which is selected on the basis of the stored information, to turn ON the group of lamps receiving electrical power from that power circuit.

In one implementation, the information stored in the system includes at least one type of information selected from the group consisting of

- the elapsed time that electrical power was supplied to one of the power circuits relative to one or more of the other power circuits,
- the number of times the supply of electrical power was initiated for one of the power circuits relative to one or more of the other power circuits, and
- the elapsed time that electrical power was supplied to one of the power circuits per initiation of the supply of electrical power to that power circuit, relative to one or more of the other power circuits.

For example, the power circuit selected to be supplied with electrical power in response to the control signal is the power circuit having at least one of (1) the shortest cumulative time during which electrical power was supplied thereto, (2) the lowest number of times the supply of electrical power was initiated therefor, and (3) the lowest average time during which electrical power was supplied thereto per initiation of the supply of power thereto.

BRIEF DESCRIPTION OF THE DRAWINGS

The invention may best be understood by reference to the following description taken in conjunction with the accompanying drawings, in which:

FIG. 1 is a front elevation of a wall plate control unit used with one embodiment of a lighting load management system embodying the invention.

FIG. 2 is a side elevation of the wall plate control unit of FIG. 1.

FIG. 3 is a top plan view of the wall plate control unit of FIG. 1.

FIG. 4 is the same front elevation shown in FIG. 1 with the front covers of the two pushbuttons removed to reveal the underlying structures.

FIG. 5 is a side elevation of the wall plate control unit of FIG. 4.

FIG. 6 is a top plan view of the wall plate control unit of FIG. 4.

DETAILED DESCRIPTION OF THE ILLUSTRATED EMBODIMENTS

Figure 7:
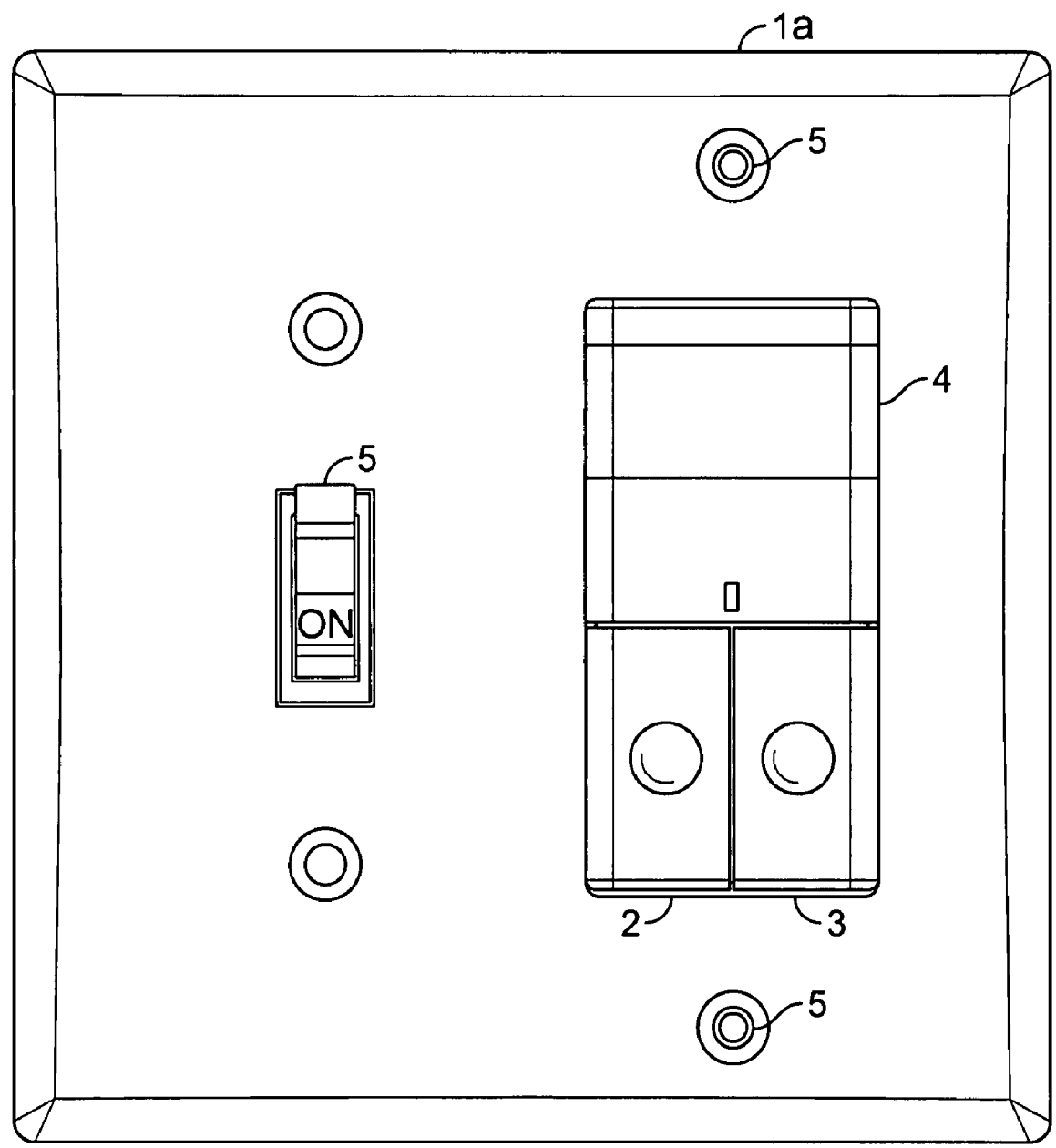
FIG. 7 is a front elevation of a modified wall plate control unit used with one embodiment of a lighting load management system embodying the invention.

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Turning now to the drawings and referring first to FIGS. 1-3, a wall plate 1 surrounds a control unit that includes a pair of pushbuttons 2 and 3 and a transparent cover 4 for the lens of a motion sensor for detecting motion within a space having artificial illumination. The plate 1 forms a pair of holes 5 for receiving a pair of screws to attach the plate 1 to a wall. FIGS. 4-6 show the same control unit shown in FIGS. 1-3 with the wall plate 1 and the covers of the pushbuttons 2 and 3 removed, revealing the underlying metal frame 6 and control unit 7. As seen most clearly in FIG. 4, the front of the control unit 7 includes a DIP switch 8, the actuators 2a and 3a of the respective pushbuttons 2 and 3, a three-position mode switch 9, and a potentiometer 10 for adjusting the sensitivity of an ambient light sensor.

FIG. 7 illustrates a modified wall plate 1a that accommodates a standard on/off switch S, in addition to the control unit 7.

Figure 8:
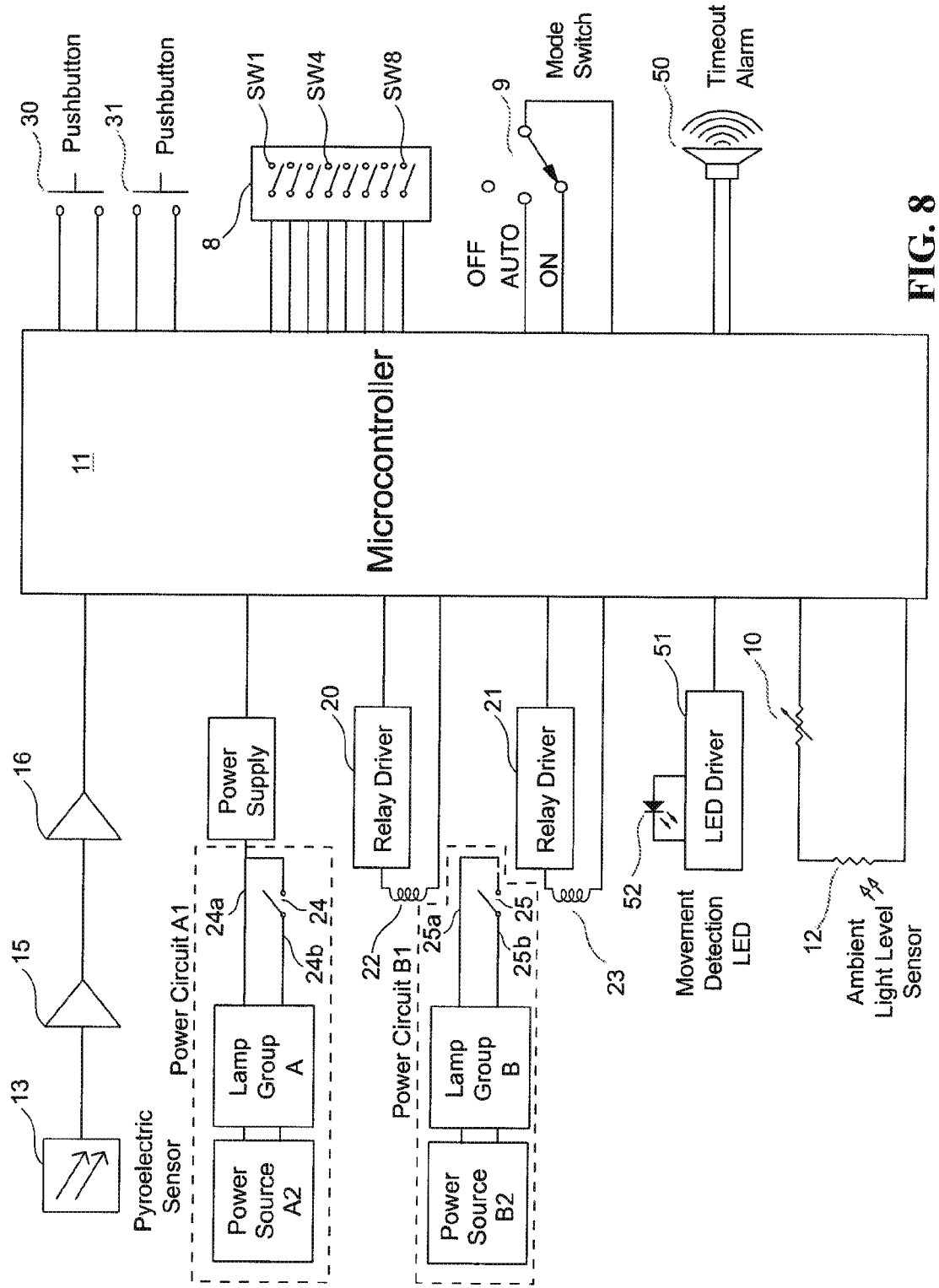
FIG. 8 is a diagrammatic illustration of one embodiment of a lighting load management system for a lighting system having two or more electrical power circuits for a space equipped with multiple lamps.

FIG. 8 illustrates the control unit 7 in more detail. A microcontroller (processor) 11 receives input signals from multiple sensors and switches and uses these input signals, along with information that it stores regarding successive energization and de-energization of different lamp groups A and B, to produce output signals that control the supply of power to multiple power circuits that supply power to different groups of lamps for illuminating a common space at different light levels. The microcontroller 11 executes an algorithm that determines which lamp group should be energized or de-energized each time an "initiating event" indicates a need to increase or decrease the artificial illumination of the monitored space.

Specifically, the microcontroller 11 receives input signals from an ambient light sensor 12, such as a conventional cadmium sulfide sensor whose resistance varies in proportion to the intensity of the ambient light, thereby varying the current flow through, and thus the voltage drop across, the sensor 12; and a motion detector 13, such as a conventional passive infrared ("PIR") sensor that detects infrared emissions from occupants in the monitored space. The sensitivity of the ambient light sensor 12 can be adjusted by the potentiometer 10. The output signal from the motion detector 13 is passed through a bandpass filter 15 and a low-pass filter 16 to remove spurious signals that do not represent movement of occupants.

Another type of event that can be used to turn selected groups of light ON or OFF is an event that requires an adjustment of the load imposed on a power distribution system. Such load-shedding or load-restoring commands are generated by systems designed to control the rates charged for power consumption under agreements that base the charge on the conditions that exist at the time of consumption, such as the time of day, the overall load on the system, etc.

The microcontroller 11 produces control signals for a pair of relay drivers 20 and 21 that control the energization and de-energization of respective coils 22 and 23 of a pair of latching relays. The coils 22 and 23 control the opening and closing of coffesponding relay contacts 24 and 25, which in turn control the energization and de-energization of a pair of power circuits A1 and B1 providing power to two lamp groups A and B. Specifically, closing the relay contacts 24 supplies power to lamp group A by connecting lines 24a and 24b, which closes a circuit that includes a conventional power source A2 and lamp group A. Similarly, closing the relay contacts 25 supplies power to lamp group B by connecting lines 25a and 25b, which closes a circuit that includes a conventional power source B2 and lamp group B. Thus, the control signals supplied by the microcontroller 11 to the relay drivers 20 and 21 can control whether either or both of the lamp groups A and B are supplied with power at any given time. It will be understood that additional lamp groups may be accommodated by simply replicating the circuitry associated with lamp group A or B.

As will be described in detail below, the microcontroller 11 can supply control signals to the relay drivers 20 and 21 in response to the execution of an algorithm that utilizes stored information related to the history of energization and de-energization of the two lamp groups A and B. Alternatively, the control signals can be produced in response to the operation of the manual pushbutton-operated (momentary) switches 30 and 31, which act as toggle switches. Thus, if lamp group A is OFF, pressing pushbutton 2 momentarily closes the switch 30 to cause the microcontroller 11 to send the relay driver 20 a control signal that causes the driver to turn ON lamp group A. Pressing the pushbutton 2 again turns OFF lamp group A. Pushbutton 3 and its switch 31 operate in the same manner for controlling lamp group B.

The manually operated mode switch 9 can be set to any of three positions to cause the microcontroller 11 to operate in any of three different modes. The "AUTO" mode causes the microcontroller 11 to send control signals to the relay drivers 20 and 21 in response to the results of an algorithm executed by the microcontroller, as described in detail below. In the "ON" mode, the microcontroller 11 produces control signals that cause both relay contacts 24 and 25 to close and remain closed, so that both lamp groups A and B are energized, regardless of what conditions or events are sensed. In the "OFF" mode, the microcontroller 11 produces control signals that cause both relay contacts 24 and 25 to open and remain open, so that both lamp groups A and B are de-energized, regardless of what conditions or events are sensed. When either the "ON" or "OFF" mode is selected, the states of the relay contacts 24 and 25 cannot be altered by pressing either of the pushbuttons 2 and 3.

The microcontroller 11 also receives inputs from the manually settable DIP switch 8, which in the illustrative example has eight switches SW1-SW8 that can be individually set ON or OFF. The settings of the eight switches SW1-SW8 select the features of the control system for the "AUTO" mode, as follows:

|  |  | Position | |
| --- | --- | --- | --- |
| DIP | Feature | ON | OFF |
| SW1 | Timeout Value | see table below | see table below |
| SW2 | Timeout Value | see table below | see table below |
| SW3 | Timeout Value | see table below | see table below |
| SW4 | Activation | Automatic ON | Manual ON |
| SW5 | Audible Alert | Enabled | Disabled |
| SW6 | Walk Through | Enabled | Disabled |
| SW7 | Reduced Sensitivity | Enabled | Disabled |
| SW8 | Load Balance | Enabled | Disabled |

The timeout values selectable by the settings of the first three switches SW1-SW3 are as follows:

| Time Delay (Minutes) | SW3 | SW2 | SW1 |
| --- | --- | --- | --- |
| (Unused) | OFF | OFF | OFF |
| 2 | OFF | OFF | ON |
| 5 | OFF | ON | OFF |
| 10 | OFF | ON | ON |
| 15 | ON | OFF | OFF |
| 20 | ON | OFF | ON |
| 25 | ON | ON | OFF |
| 30 | ON | ON | ON |

When the switch SW4 is set to the "AUTOMATIC ON" mode position and motion is detected by the occupancy sensor 13, the microcontroller 11 sends a control signal to the relay driver 20 to cause the relay coil 22 to be energized, thereby turning ON the lamp group selected by an algorithm executed by the microcontroller 11, as described in more detail below. At the same time, the microcontroller 11 starts a "delayed off" timer to measure a fixed time interval (e.g., 5 minutes), and repetitively re-starts the timer if motion is detected during that interval. When motion is not detected during the fixed time interval measured by the "delayed off" timer, the system turns OFF both lamp groups.

With the switch SW4 set in the "AUTOMATIC ON" position, the pushbutton-operated switches 30 and 31 can toggle their respective lamp groups A and B ON and OFF, regardless of what other features have been selected by the settings of the DIP switch 8. When either lamp group A or B is toggled OFF by its associated pushbutton 2 or 3, the system starts an "intentional off" timer to measure a fixed time interval (e.g., 5 minutes), and is repetitively re-started if motion is detected during that interval. When motion is not detected during the fixed time interval measured by the "intentional off" timer, the system reverts to the "AUTOMATIC ON" operation at the end of that interval. When either lamp group is toggled ON by its associated pushbutton 2 or 3, the system turns off the "intentional off" timer and reverts to the "AUTOMATIC ON" operation. This feature prevents the lights from being turned OFF as long as occupants are still present in the monitored space, even after a pushbutton has been pressed to intentionally turn the lights OFF.

With the switch SW4 set in the "MANUAL ON" position, the pushbutton-operated switches 30 and 31 must be used to toggle their respective lamp groups A and B ON, regardless of what other features have been selected by the settings of the DIP switch 8. The system will not automatically turn ON either lamp group with the switch SW4 in this position. When either lamp group A or B is toggled ON, the system energizes the relay coil associated with that lamp group and also starts the "delayed off" timer. The "delayed off" timer is typically set to measure a fixed time interval (e.g., 5 minutes), and repetitively re-starts each time motion is detected, or either lamp group is toggled ON by one of the pushbuttons 30 and 31, during that interval. This feature prevents the lights from being turned OFF as long as occupants are present in the monitored space, while also ensuring that the lights will be automatically turned OFF within a short time after the space has been vacated.

When motion is not detected during a fixed time interval measured by the "delayed off" timer, the system turns OFF both lamp groups and then reverts to "MANUAL ON" operation. The system also starts a "reactivation" timer that measures a fixed "grace" period (e.g., 15 to 30 seconds). If motion is detected during this "grace" period, any lamp group just turned OFF is turned ON again, and the "delayed off" timer is re-started. If no motion is detected during the "grace" period, both lamp groups remain OFF When the "Load Balance" DIP switch SW8 is set to the ON position to enable this feature, successive microcontroller output signals energize the relay coils 22 and 23 alternately, which causes the lamp groups A and B to be energized alternately. An alternative strategy is to have the microcontroller change the "primary" power circuit sequentially on a periodic basis, such as daily, weekly, monthly, etc. For example, the power circuit for lamp group A can be the primary circuit in the first week, the power circuit for lamp group B can be the primary circuit in the second week, and so forth. When the "Load Balance" feature is disabled by setting the DIP switch SW8 to the OFF position, lamp group A is always energized when only one lamp group is needed, and lamp group B is energized only when both lamp groups are needed.

The "Walk-Through" feature, which is enabled by the setting of the DIP switch SW6, operates independently of the setting of the switch SW4. When the "Walk-Through" feature is enabled and both lamp groups are OFF, the system starts a "temporary timeout" timer to initiate a "temporary timeout" period (e.g., two minutes) when movement is first detected or when a lamp group is manually turned ON by one of the pushbuttons 2 or 3. If movement is detected after the first 30 seconds, then the system reverts to the normal timeout period determined by the settings of the switches SW1-SW3. If no movement is detected after the first 30 seconds, then the system continues with the "temporary timeout" value. The "Walk-Through" mode is not active when the system is re-triggered within 30 seconds of an OFF event by the "grace" period timer.

The "Audible Alert" feature, which is selected by the setting of the switch SW5, causes the microcontroller 11 to produce a timeout alarm signal that activates an alarm 50 to alert occupants when the artificial illumination is about to be turned OFF. For example, a single one-second tone may be produced ten seconds prior to turning OFF both lamp groups. If movement is detected during the ten seconds following the one-second tone, two half-second tones may be produced to indicate that occupancy has been detected. The "Reduced Sensitivity" feature, which is selected by the setting of the switch SW7, reduces the sensitivity of the motion sensor to approximately 60% of the maximum sensitivity by changing the sensitivity of the pyroelectric sensor circuit. Specifically, operating the switch SW7 changes the detection threshold of a comparator circuit by inserting another resistor in parallel with the bottom leg of a voltage divider network that sets the threshold of a double-ended limit detector (window comparator). Whenever an amplified signal from the PIR sensor rises above this threshold, the microcontroller is alerted.

The signal from the ambient light sensor is utilized by the microcontroller 11 whenever the mode switch 9 is set to the "AUTO" position. The ambient light sensor 12 continuously measures the ambient light level, and the setting of the potentiometer 10 sets an ambient-light threshold (e.g., over a range from approximately 0.5 foot-candles to approximately 250 foot-candles). When the ambient light is below the threshold and motion is detected, both lamp groups A and B are turned ON. When the ambient light is above the threshold and motion is detected, only the primary light group (e.g., group A) is turned ON. If the secondary lamp group (e.g., group B) is ON when the ambient light level rises above the threshold while the space is occupied, the secondary lamp group is not turned OFF. If the secondary lamp group (e.g., group B) is OFF when the ambient light level falls below the threshold while the space is occupied, the secondary lamp group is turned ON. Setting the potentiometer to a threshold value at the lower end of the threshold range essentially causes the secondary lamp group to be always turned ON in response to occupancy. If a failure occurs with the ambient light sensor, the system allows the secondary lamp group to turn ON by disabling this feature, i.e., setting the threshold to the upper end of its range.

The microcontroller 11 also produces a movement detection signal that causes an LED driver 51 to momentarily turn ON a movement detection LED 52, each time the microcontroller receives a signal from the PIR sensor 13 indicating that movement within the monitored space has been detected.

Figure 9:
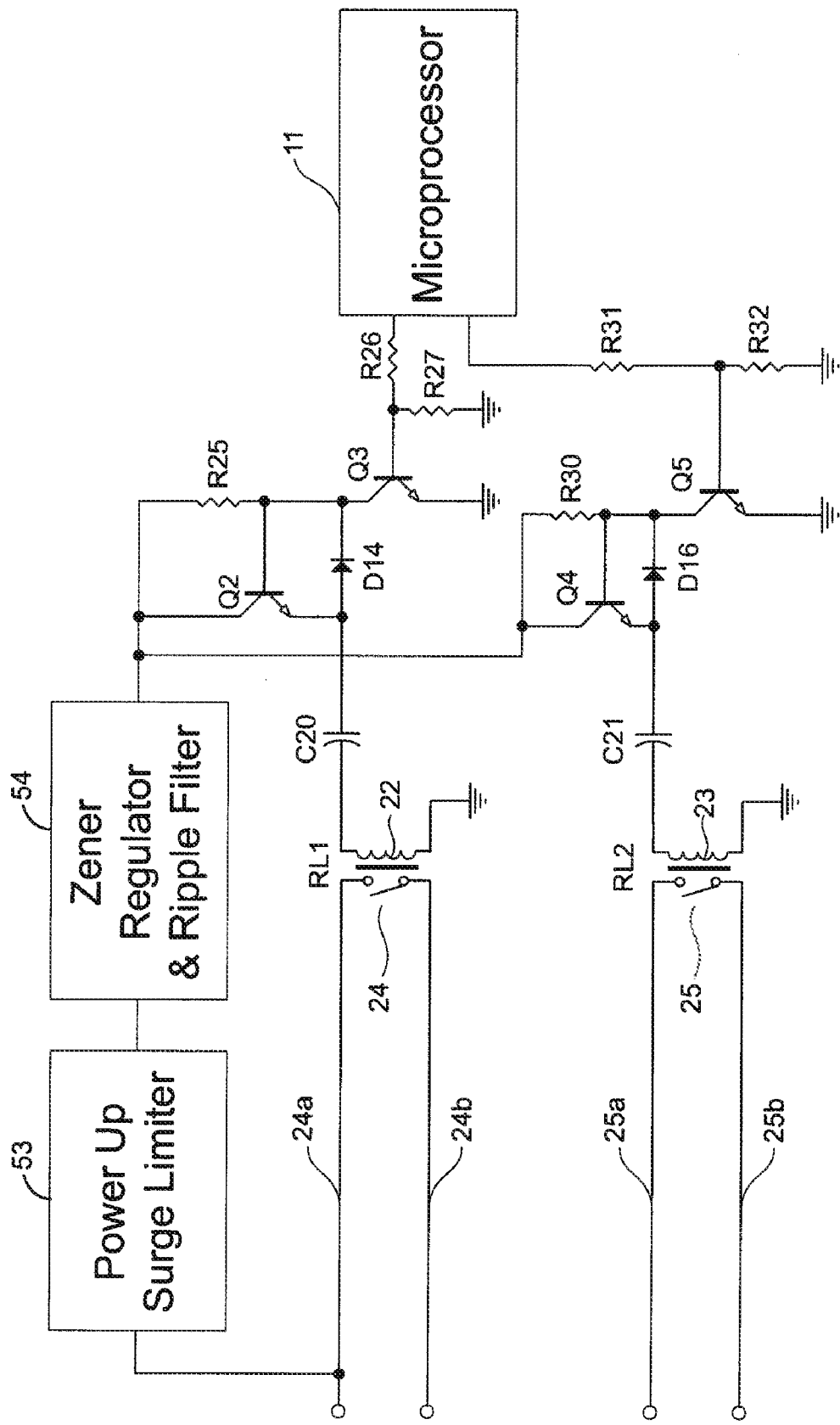
FIG. 9 is an electrical schematic diagram for one specific implementation of a portion of the lighting load management system of FIG. 8.

FIG. 9 is a schematic diagram of one implementation of the relay driver circuits 20 and 21 (FIG. 8) that control the energization and de-energization of the lamp groups A and B in response to signals produced by the microcontroller 11. The control signals from the microcontroller 11 are supplied to the bases of respective transistors Q3 and Q5 via voltage dividers formed by resistor pairs R26, R27 and R31, R32 to control the energization and de-energization of respective coils 22 and 23 of relays RL1 and RL2. For example, when the control signal for the relay RL1 goes high, it turns on the transistor Q3, which draws current through a resistor R25 from a power supply derived from the power line 24a via a conventional power-up surge limiter 53 and a conventional zener regulator and ripple filter 54. The base of a transistor Q2 is connected to the junction of the resistor R25 and the collector of the transistor Q3.

As long as the transistor Q3 is off, the transistor Q2 supplies a trickle charge to a capacitor C20, and the contacts 24 of the latching relay RL1 remain open. When the transistor Q3 is turned on by the control signal from the microcontroller 11, the transistor Q2 turns off, and the capacitor C20 discharges through a diode D14 and the transistor Q3. This causes the latching relay to close its contacts 24, which closes the circuit between the power conductors 24a and 24b to supply power to the lamp group A. This circuitry maintains the current levels below 0.5 milliamp to satisfy standards requirements for installations where the ground connection is used for control power.

The latching relay RL2 for lamp group B is controlled in the same manner by an identical relay driver formed by transistors Q5 and Q4, resistor R30, capacitor C21 and diode D16.

In the event of a power interruption, the position of the relay contacts is as follows:
1. If the switch SW4 is in the "AUTOMATIC ON" position, the relay contacts remain closed for a short time after the power is restored.
2. If the switch SW4 is in the "MANUAL ON" position and the relay contacts were open prior to the interruption, the contacts remain open.
3. If the switch SW4 is in the "MANUAL ON" position and the relay contacts were closed prior to the interruption, the system temporarily enters the AUTOMATIC ON mode, allowing the contacts to close.

Figure 10:
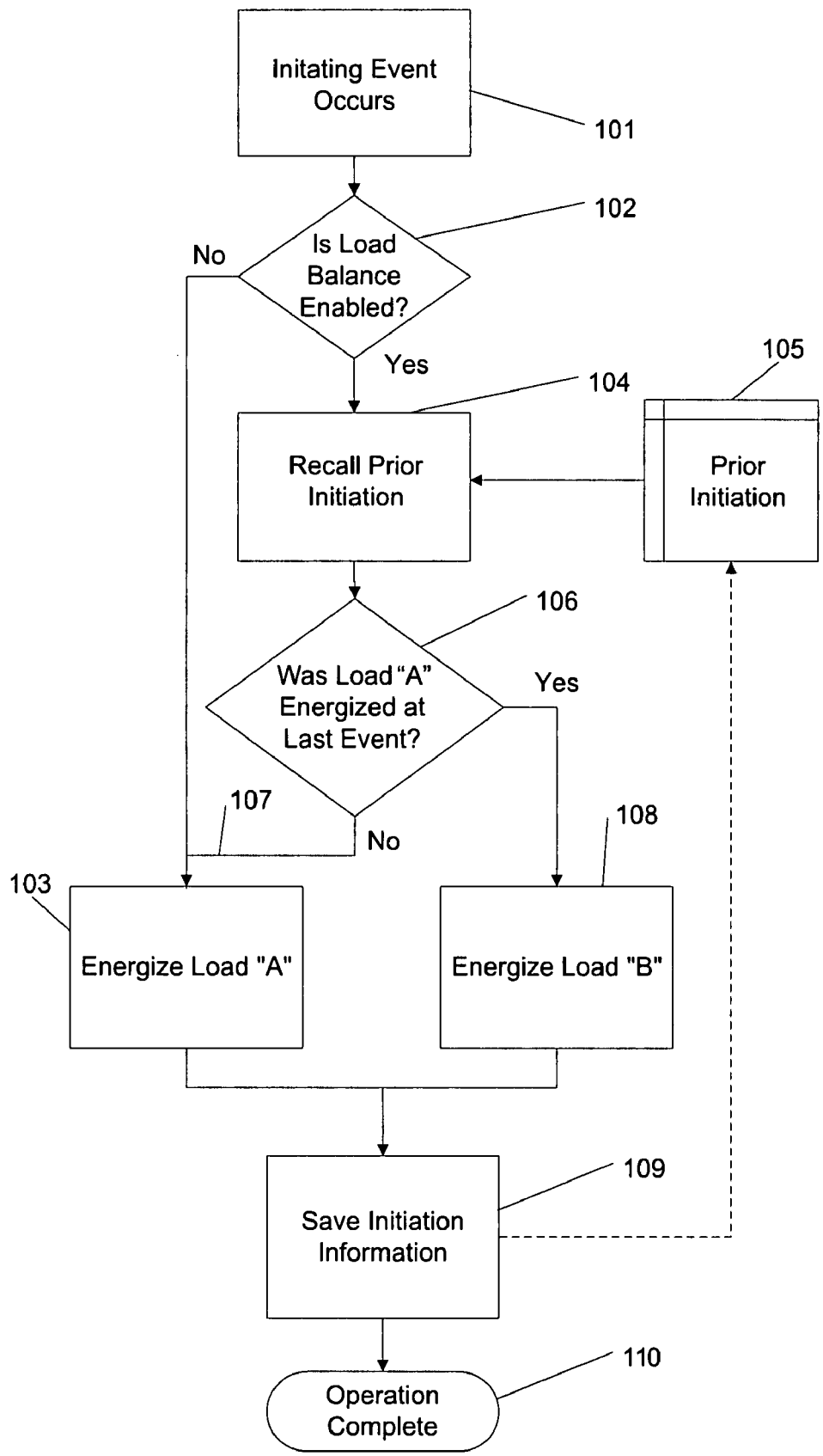
FIG. 10 is a flow chart of one embodiment of a routine that can be executed by the microcontroller in the system of FIGS. 8 and 9.

FIG. 10 is a flow chart of an algorithm that can be executed by the microcontroller 11, in response to an initiating event, to select the power circuit(s) to be supplied with power, based on stored information representing which power circuit was energized in response to the previous initiating event. The sub-routine of FIG. 10 is initiated by the detection of an event that indicates that a change in the artificial illumination of the monitored space is needed or allowable, when the DIP switch SW4 is set to the Automatic ON position. Examples of such initiating events are a change in the occupancy status of the space (becoming occupied or unoccupied) as detected by the sensor 13, or a change in the natural (ambient) light level in the space as detected by the sensor 12.

The occurrence of an initiating event is detected at step 101 and causes the sub-routine to proceed to step 102 to determine whether the "load balance" feature has been enabled by the setting of the switch SW8. If the answer at step 102 is negative, the sub-routine proceeds to step 103 to energize relay coil 22 to turn ON the "primary" lamp group A. If the answer at step 102 is affirmative, the routine proceeds to step 104 which retrieves from memory 105 information indicating which lamp group was previously energized.

After the previously energized lamp group has been identified by the information retrieved at step 104, the system proceeds to step 106 to determine whether lamp group A was the previously energized group. If the answer is affirmative, then the lamp group B is energized at step 107. If the answer at step 106 is negative, the lamp group B is energized at step 108. In either case, the routine then proceeds to step 109 to store the identification of the newly energized lamp group in the memory 105. The routine is then exited at step 110.

Figure 11:
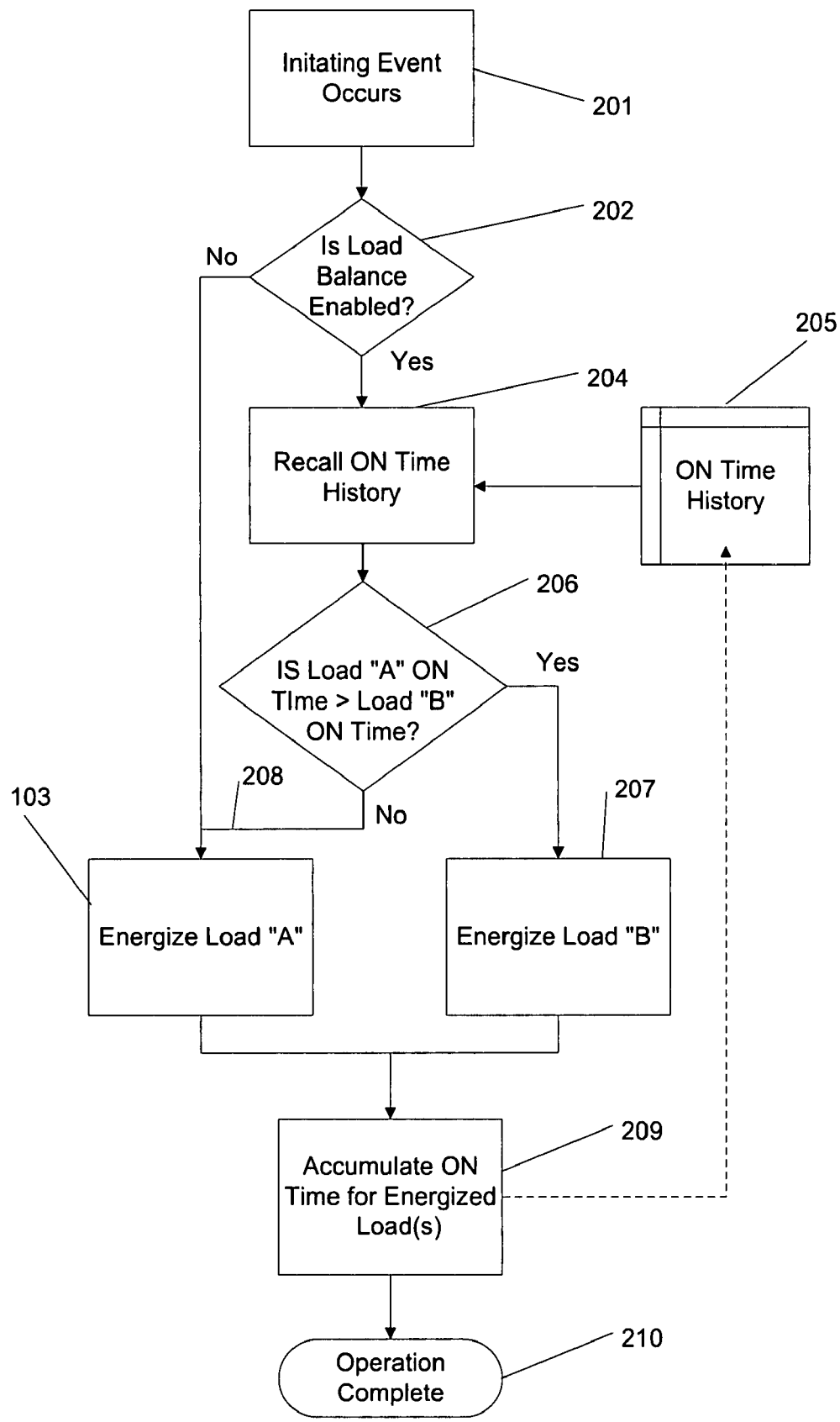
FIG. 11 is a flow chart of another embodiment of another routine that can be executed by the microcontroller in the system of FIGS. 8 and 9.

FIG. 11 is a flow chart of an alternative algorithm that can be executed by the microcontroller 11, in response to an initiating event, to select the power circuit(s) to be supplied with power, based on the stored information relating to the history of energization and de-energization of the different power circuits. The sub-routine of FIG. 11 is initiated by the detection of an event that indicates that a change in the artificial illumination of the monitored space is needed or allowable, when the DIP switch SW4 is set to the Automatic ON position. Examples of such initiating events are a change in the occupancy status of the space (becoming occupied or unoccupied) as detected by the sensor 13, or a change in the natural (ambient) light level in the space as detected by the sensor 12.

The occurrence of an initiating event is detected at step 201 and causes the sub-routine to proceed to step 202 to determine whether the "load balance" feature has been enabled by the setting of the switch SW8. If the answer at step 202 is negative, the sub-routine proceeds to step 203 to energize relay coil 22 to turn ON the lamp group A, which is the group of lamps designated as the "primary" group. If the answer at step 202 is affirmative, the routine proceeds to step 204 which retrieves from memory 205 information relating to the history of energization and de-energization of each individual power circuit. In this particular sub-routine, the retrieved information represents the cumulative "ON" time for each of the two lamp groups A and B.

After the stored information has been retrieved at step 204, the system proceeds to step 206 to compare the cumulative "ON" times of the two lamp groups. If the cumulative "ON" time for group A is greater than that of group B, the lamp group B is energized at step 207. If the reverse is true, the system energizes the lamp group B at step 208. In either case, the routine then proceeds to step 209 to resume accumulation of the "ON" time of the selected lamp group and storage of that information in the memory 205. The routine is then exited at step 210.

Instead of accumulating the "ON" time of each circuit, the system could store a number representing the difference between the "ON" times of the two circuits. A positive number could indicate a longer cumulative "ON" time for lamp group A, and a negative number a longer cumulative "ON" time for lamp group B. The algorithm would then simply check the polarity of the stored number and treat the lamp group not represented by that polarity as the "primary" group (i.e., to be energized first).

In the embodiments described above, the sensors and the power circuitry are all contained in the same housing, which is sufficiently compact to be made as an integral part of a wall unit. It should be understood, however, that the power circuitry can be packaged separately from the sensors in a separate housing that can be mounted in a location remote from the wall unit containing the sensors.

Instead of, or in addition to, controlling the energization and de-energization of multiple power circuits, the energization and de-energization of multiple lamps may be controlled by the use of controllable fluorescent ballasts. Such ballasts are used in digitally addressable lighting systems in which all or some of the lamps have controllable ballasts coupled to a network that can be used to communicate with each individual ballast. The ballast is able to respond to such communications to turn a lamp ON or OFF or to adjust the "dim level" of the lamp. Thus, the control signals produced by the microprocessor in the system described above can be used to control individual lamps, rather than power circuits, to achieve a substantially uniform lamp "wear rate" (e.g., cumulative illumination time and/or number of power initiation events).

When a monitored space is occupied but little or no motion occurs, the lamps in all groups can be automatically turned OFF. Audible tones have been used as alerts that lights are about to be turned OFF, but audible alerts can be masked by other sounds or headphones or hearing protection. Blinking the lights has also been used as an alert, but certain types of lamps cannot be blinked (e.g., HID lamps that require 5-10 minute cool-down periods). With the multiple power circuits used in the system of the present invention, the occupant(s) can be alerted that the lamps are about to be turned OFF, by turning the multiple circuits OFF sequentially rather than simultaneously. When the first circuit is turned OFF, the occupant(s) have time to re-start the control system to keep one or more of the power circuits ON, e.g., an occupant can move to re-start the "delayed off" timer, or one of the pushbuttons 2 and 3 can be pressed.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A lighting control process for a space equipped with multiple lamps for illuminating the space and multiple power circuits for supplying power to different groups of said lamps, said process comprising:
   storing information relating to the past illumination of the lamps in each of said different groups,
   detecting conditions or events that indicate that increased illumination of said space by said lamps is needed,
   producing a first control signal in response to the detection of a condition or event that indicates that increased illumination of said space by said lamps is needed, and
   in response to said first control signal, supplying power to at least one of said power circuits, which is selected on the basis of said stored information, to turn on the group of lamps receiving electrical power from that power circuit.

2. The process of claim 1 in which said stored information includes information relating to the past supplying of electrical power to the lamps in each of said different groups.

3. The process of claim 2 which includes:
   detecting conditions or events that indicate that decreased illumination of said space by said lamps is allowable,
   producing a second control signal in response to the detection of a condition or event that indicates that decreased illumination of said space by said lamps is allowable, and
   in response to said second control signal, interrupting the supply of power to at least one of said power circuits, which is selected on the basis of said stored information, to turn off the group of lamps receiving electrical power from that power circuit.

4. The process of claim 3 which includes interrupting the supply of power to multiple power circuits sequentially in response to said second control signal.

5. The lighting control process of claim 3 which includes producing an alert prior to interrupting the supply of power to all of said power circuits.

6. The lighting control process of claim 1 in which said stored information comprises at least one type of information selected from the group consisting of
   the elapsed time that electrical power was supplied to one of said power circuits relative to one or more of the other power circuits,
   the number of times the supply of electrical power was initiated for one of said power circuits relative to one or more of the other power circuits, and the elapsed time that electrical power was supplied to one of said power circuits per initiation of the supply of electrical power to that power circuit, relative to one or more of the other power circuits.

7. The lighting control process of claim 6 in which said stored information is for the lamps currently powered by said power circuits.

8. The lighting control process of claim 1 which includes:
detecting conditions or events that indicate that decreased illumination of said space by said lamps is allowable,
producing a second control signal in response to the detection of a condition or event that indicates that decreased illumination of said space by said lamps is allowable, and
in response to said second control signal, interrupting the supply of power to a power circuit having at least one of (1) the greatest cumulative time during which electrical power was supplied thereto, (2) the highest number of times the supply of electrical power was initiated therefor, and (3) the highest average time during which electrical power was supplied thereto per initiation of the supply of power thereto.

9. The lighting control process of claim 1 in which said conditions include at least one condition selected from the group consisting of the ambient light level in said space, and the presence or absence of occupants in said space.

10. The lighting control process of claim 1 in which the power circuits to which power is to be supplied are selected to provide a substantially uniform illumination time for all the lamps in all of said groups, a substantially uniform number of times the supply of electrical power is initiated for all the lamps in all of said groups, or a substantially uniform average time during which electrical power is supplied to all the lamps in all of said groups per initiation of the supply of electrical power to said groups.

11. A lighting control process for a space equipped with multiple lamps for illuminating the space and multiple power circuits for supplying power to different groups of said lamps, said process comprising:
storing information relating to the past illumination of the lamps in each of said different groups,
detecting conditions or events that indicate that increased illumination of said space by said lamps is needed,
producing a first control signal in response to the detection of a condition or event that indicates that increased illumination of said space by said lamps is needed, and
in response to said first control signal, supplying power to at least one of said power circuits, which is selected on the basis of said stored information, to turn on the group of lamps receiving electrical power from that power circuit,
said stored information comprises at least one type of information selected from the group consisting of
the elapsed time that electrical power was supplied to one of said power circuits relative to one or more of the other power circuits,
the number of times the supply of electrical power was initiated for one of said power circuits relative to one or more of the other power circuits,
the elapsed time that electrical power was supplied to one of said power circuits per initiation of the supply of electrical power to that power circuit, relative to one or more of the other power circuits, and
said power circuit selected to be supplied with electrical power in response to said first control signal is the power circuit having at least one of (1) the shortest cumulative time during which electrical power was supplied thereto, (2) the lowest number of times the supply of electrical power was initiated therefor, and (3) the lowest average time during which electrical power was supplied thereto per initiation of the supply of power thereto.

12. A lighting control system for an area equipped with multiple lamps, a plurality of electrical power circuits each of which is coupled to a different group of said lamps for turning the lamps in that group on and off, and one or more devices producing control signals in response to events that affect the amount of light desired from said lamps, said system comprising:
a controllable switch for controlling the supply of electrical power to each of said plurality of electrical power circuits,
a memory storing information relating to the past illumination of the lamps in said different groups, and
a controller coupled to said devices and said controllable switch for automatically selecting the electrical power circuits to which electrical power is supplied or interrupted based on said control signals and said stored information, said controller initially selecting less than all of said electrical power circuits to be turned on when all of said circuits have been turned off.

13. The lighting control system of claim 12 in which said control devices include occupancy sensors producing control signals in response to the occupancy status of selected spaces illuminated by said lamps.

14. The lighting control system of claim 12 in which said information stored in said memory includes at least one type of information selected from the group consisting of:
the elapsed time that electrical power was supplied to one of said power circuits relative to one or more of the other power circuits,
the number of times the supply of electrical power was initiated for one of said power circuits relative to one or more of the other power circuits, and
the elapsed time that electrical power was supplied to one of said power circuits per initiation of the supply of electrical power to that power circuit, relative to one or more of the other power circuits.

15. The lighting control system of claim 14 in which said power circuit selected by said controller to be supplied with electrical power in response to said first control signal is the power circuit having at least one of (1) the shortest cumulative time during which electrical power was supplied thereto, (2) the lowest number of times the supply of electrical power was initiated therefor, and (3) the lowest average time during which electrical power was supplied thereto per initiation of the supply of power thereto.

16. The lighting control system of claim 14 in which said power circuit selected by said controller to have its power interrupted is the power circuit having at least one of (1) the greatest cumulative time during which electrical power was supplied thereto, (2) the highest number of times the supply of electrical power was initiated therefor, and (3) the highest average time during which electrical power was supplied thereto per initiation of the supply of power thereto.

17. The lighting control system of claim 12 in which said devices include ambient light sensors producing control signals in response to the level of ambient light in selected spaces illuminated by said lamps.

18. The lighting control system of claim 12 in which said devices include manually operated switches.

19. The lighting control system of claim 12 in which said controllable switch comprises at least one device selected from the group consisting of relays, solid-state switches and remotely operable circuit breakers.

20. The lighting control system of claim 12 in which each of said groups of lamps produces substantially similar lighting effects.

* * * * *